(12) United States Patent
Anderson et al.

(10) Patent No.: US 7,213,069 B2
(45) Date of Patent: May 1, 2007

(54) CATEGORY NAME SERVICE ABLE TO OVERRIDE THE CATEGORY NAME BASED ON REQUESTOR PRIVILEGE INFORMATION

(75) Inventors: Todd J. Anderson, Portland, OR (US); Stephen Caird, Eugene, OR (US); David B Lamkins, Portland, OR (US); John T. Larason, Aloha, OR (US); Alan C. Packer, Portland, OR (US)

(73) Assignee: Microsoft Corporation, Redmond, WA (US)

( * ) Notice: Subject to any disclaimer, the term of this patent is extended or adjusted under 35 U.S.C. 154(b) by 1051 days.

(21) Appl. No.: 09/796,811

(22) Filed: Feb. 28, 2001

(65) Prior Publication Data

US 2002/0120754 A1 Aug. 29, 2002

(51) Int. Cl.
*G06F 15/16* (2006.01)
(52) U.S. Cl. .................. 709/225; 709/206; 709/207
(58) Field of Classification Search ............... 709/218, 709/229, 217, 202, 203; 715/500; 707/10, 707/101, 102
See application file for complete search history.

(56) References Cited

U.S. PATENT DOCUMENTS

| | | | |
|---|---|---|---|
| 4,991,094 A | 2/1991 | Fagan et al. |
| 5,461,698 A | 10/1995 | Schwanke et al. |
| 5,640,468 A | 6/1997 | Hsu |
| 5,652,829 A | 7/1997 | Hong |
| 5,657,424 A | 8/1997 | Farrell et al. |
| 5,678,041 A | 10/1997 | Baker et al. |
| 5,706,507 A | 1/1998 | Schloss |
| 5,708,822 A | 1/1998 | Wical |
| 5,734,796 A | 3/1998 | Pao |
| 5,768,580 A | 6/1998 | Wical |
| 5,809,499 A | 9/1998 | Wong et al. |
| 5,812,995 A | 9/1998 | Sasaki et al. |
| 5,835,905 A | 11/1998 | Pirolli et al. |
| 5,867,799 A | 2/1999 | Lang et al. |
| 5,870,744 A | 2/1999 | Sprague |
| 5,911,043 A | 6/1999 | Duffy et al. |
| 5,920,864 A | 7/1999 | Zhao |

(Continued)

FOREIGN PATENT DOCUMENTS

WO  WO 0067161 A2  11/2000

(Continued)

OTHER PUBLICATIONS

Jenkins, et al. Adaptive Automatic Classification on the Web, Database and Expert Systems Applications, 11th International Workshop Sep. 4-8, 2000, pp. 504-511, Piscataway, NJ, USA, IEEE.

*Primary Examiner*—Paul H. Kang
(74) *Attorney, Agent, or Firm*—Senniger Powers

(57) ABSTRACT

A category name service is provided to conditionally return a category name for a data object upon request. The category name is returned is the category name is known or if the requester has subscribed for dynamic determination service, and the dynamic determination is successful. In selected embodiments, the category name service includes the dynamic determination service. In selected embodiments, the category name service also provides for the requestor to request review of a returned category name and/or request override of a returned category name. In selected embodiments, the category name service also includes the dynamic determination, review, and/or override service.

24 Claims, 11 Drawing Sheets

U.S. PATENT DOCUMENTS

| | | |
|---|---|---|
| 6,055,540 A | 4/2000 | Snow et al. |
| 6,058,205 A | 5/2000 | Bahl et al. |
| 6,073,137 A | 6/2000 | Brown et al. |
| 6,101,515 A | 8/2000 | Wical et al. |
| 6,128,613 A | 10/2000 | Wong et al. |
| 6,161,130 A | 12/2000 | Horvitz et al. |
| 6,163,778 A | 12/2000 | Fogg et al. |
| 6,233,575 B1 | 5/2001 | Agrawal et al. |
| 6,233,618 B1 * | 5/2001 | Shannon .................... 709/229 |
| 6,249,785 B1 | 6/2001 | Paepke |
| 6,252,988 B1 | 6/2001 | Ho |
| 6,285,999 B1 | 9/2001 | Page |
| 6,334,131 B2 | 12/2001 | Chakrabarti et al. |
| 6,370,541 B1 | 4/2002 | Chou et al. |
| 6,389,436 B1 | 5/2002 | Chakrabarti et al. |
| 6,393,415 B1 | 5/2002 | Getchius et al. |
| 6,393,427 B1 | 5/2002 | Vu et al. |
| 6,421,683 B1 | 7/2002 | Lamburt |
| 6,430,558 B1 | 8/2002 | Delano |
| 6,442,598 B1 * | 8/2002 | Wright et al. .............. 709/217 |
| 6,473,753 B1 | 10/2002 | Katariya et al. |
| 6,507,843 B1 | 1/2003 | Dong et al. |
| 6,519,580 B1 | 2/2003 | Johnson et al. |
| 6,592,627 B1 | 7/2003 | Agrawal et al. |
| 6,604,114 B1 | 8/2003 | Toong et al. |
| 6,606,659 B1 * | 8/2003 | Hegli et al. ................ 709/225 |
| 6,665,659 B1 * | 12/2003 | Logan ............................ 707/3 |
| 6,684,254 B1 * | 1/2004 | Dutta ......................... 709/229 |
| 6,728,716 B1 * | 4/2004 | Bhattacharya et al. ......... 707/10 |
| 6,732,157 B1 | 5/2004 | Gordon et al. |
| 6,745,367 B1 * | 6/2004 | Bates et al. ................. 715/500 |
| 2001/0003828 A1 * | 6/2001 | Peterson et al. ............ 709/219 |
| 2001/0032029 A1 | 10/2001 | Kauffman |
| 2001/0042085 A1 | 11/2001 | Peairs et al. |
| 2002/0010757 A1 * | 1/2002 | Granik et al. ............... 709/218 |
| 2002/0087523 A1 * | 7/2002 | Sivaraman ..................... 707/3 |
| 2002/0099730 A1 | 7/2002 | Brown et al. |
| 2002/0152222 A1 | 10/2002 | Holbrook |
| 2003/0195872 A1 | 10/2003 | Senn |

FOREIGN PATENT DOCUMENTS

| | | | |
|---|---|---|---|
| WO | WO 01/33413 A1 | 5/2001 | |

* cited by examiner

900

| URL ~ 902 | Category ~ 904 | | Other Data ~ 909 |
|---|---|---|---|
| | | | |
| | | | |
| | | | |
| | | | |

| User ID ~ 922 | User Basic Info ~ 924 | User Service Subscription Info ~ 926 | Usage & Billing Info ~ 928 | Other Data ~ 929 |
|---|---|---|---|---|
| | | | | |
| | | | | |
| | | | | |
| | | | | |

Figure 9b

CATEGORY NAME SERVICE ABLE TO OVERRIDE THE CATEGORY NAME BASED ON REQUESTOR PRIVILEGE INFORMATION

BACKGROUND OF THE INVENTION

1. Field of the Invention

The present invention relates to the field of data processing. More specifically, the present invention relates to services for identifying an attributed category for a data object, for use in applications such as rating and filtering services.

2. Background Information

The World Wide Web (WWW) is an expanding collection of diverse textual and non-textual materials, which are available for access from any location, at any time, by any person. Because of differences in individual beliefs and standards, it is not unusual for some users to find some of the contents objectionable, and want to be shielded from such contents. For example, parents often wish to shield their children from exposure to sexually explicit materials, hate speech and drug information. Similarly, companies may wish to prevent access by their employees to sites that provide or support gambling.

Notwithstanding the significant civil liberty implications associated with these concerns, a number of groups and companies have brought forward systems and techniques for assisting WWW users in blocking access to undesirable contents. For examples, SafeSurf offered by SafeSurf of Newbury, Calif., and NetNanny offered by Net Nanny Software International, of Toronto, Ontario, Canada are two example products/services available in the market for providing such blockings. Both products/services operate in accordance with a predetermined list of "undesirable" sites, pre-determined and supplied by the authors of the products/services. Access to any page denoted by a URL associated with a listed site is blocked.

Another example of such a system is the system disclosed in "Selective downloading of the types contained in hypertext documents transmitted in a computer controlled network", U.S. Pat. No. 6,098,102 issued to Neilsen et al. The Neilsen's system utilizes the file extensions of the URL to determine whether the downloading of a particular file will or will not be allowed.

Still another method for controlling access to sites is typified by the work of the Internet Content Rating Association (ICRA), which uses the technology of the Platform for Internet Content Selection (PICS) specification to allow voluntary or in the future potentially mandatory, rating of page content by the content author. Filtering can then be done, utilizing these rating tags. The method may also be augmented with a complete block of the un-rated pages.

A number of specific and general problems with these approaches have been noted. Most importantly, the WWW is constantly growing and changing. As a result, the site contents may change from time to time, and even from one access to the next. Many web sites generate user-specific pages at every access, so the basic URL often is an inadequate indicator of the content of the page. Further, content providers are often not the best or even the appropriate agent for content rating. Duplicitous content providers may deliberately misrate their contents.

Filtering systems which rely on downloading the page to the user's machine, then processing the page through some rating or filtering software, can be slow due to the limited bandwidth of the user connection to the Internet. Filtering systems which rely upon access to a list of objectionable sites may be slow due to access delays. The list of objectionable sites may also go out of date, due to the dynamic nature of the WWW.

Thus, what is desired is a system that responds quickly to user requests, but also tracks the dynamic nature of the WWW's contents.

SUMMARY OF THE INVENTION

A category name service is provided to conditionally return a category name for a data object upon request. The category name is returned if the category name is known or if the requestor has subscribed for dynamic determination service, and the dynamic determination is successful. In selected embodiments, the category name service includes the dynamic determination service.

In selected embodiments, the category name service also provides for the requestor to request review of a returned category name and/or request override of a returned category name. In selected embodiments, the category name service also includes the review, and/or override service.

In selected embodiments, the data object is a web page of a web site, and the dynamic determination service automatically walks through the entire web site, categorizing all unknown web pages.

In selected embodiments, the category name service, with or without the dynamic determination service, the review service and the override service, are implemented on one or more servers.

BRIEF DESCRIPTION OF DRAWINGS

The present invention will be described by way of exemplary embodiments, but not limitations, illustrated in the accompanying drawings in which like references denote similar elements, and in which:

FIGS. 9a–9b illustrate various example data organizations suitable for use to store the category names of the various data objects, and various user related information for practicing the present invention, in accordance with one embodiment.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as data, tables, requesting, determining, retrieving, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, microcontrollers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

Overview

Figure 1A:
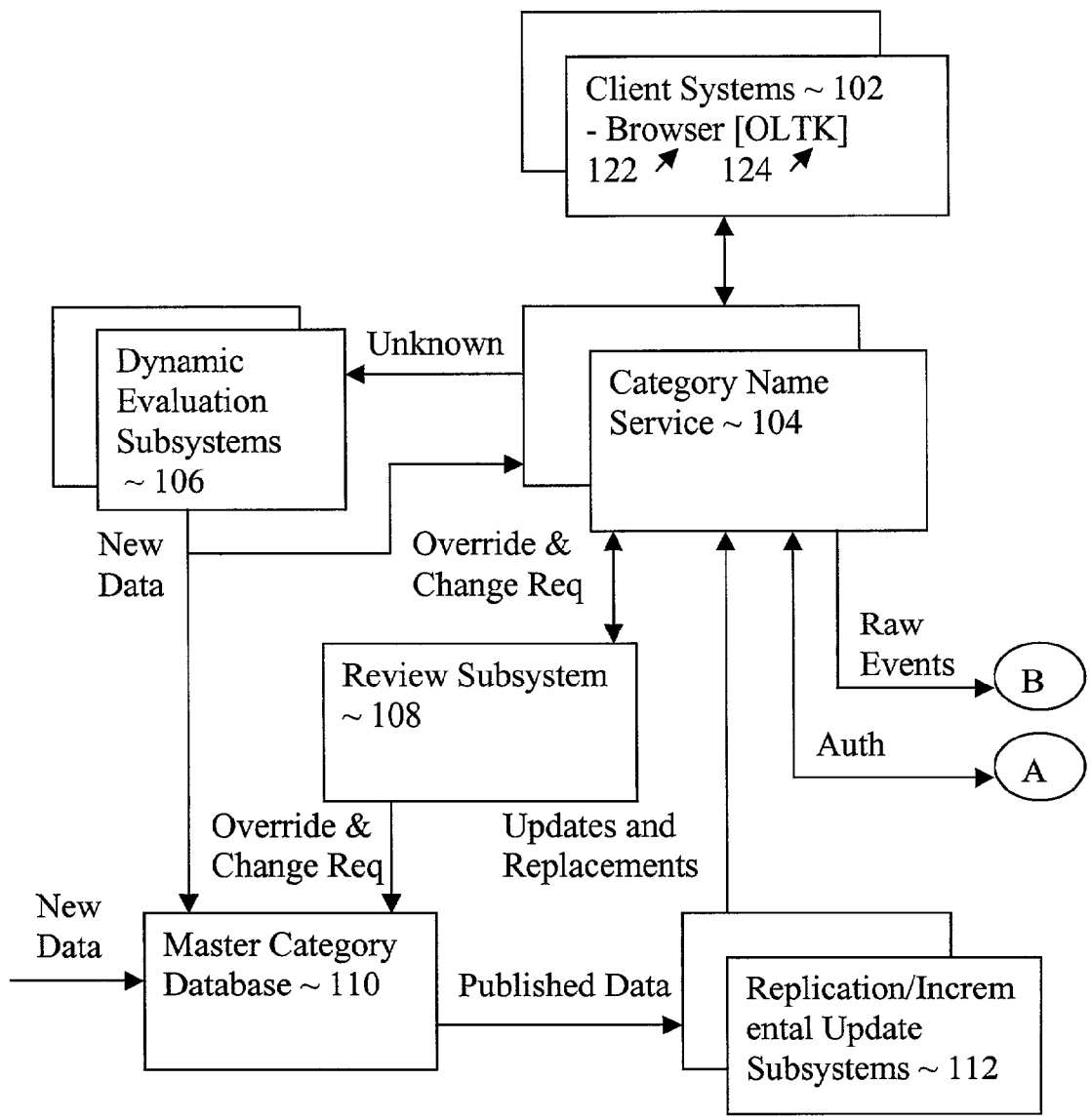
FIGS. 1a–1b illustrate an overview of the present invention, including the category name service, and a number of optional supplemental services, in accordance with one embodiment.
Figure 1B:
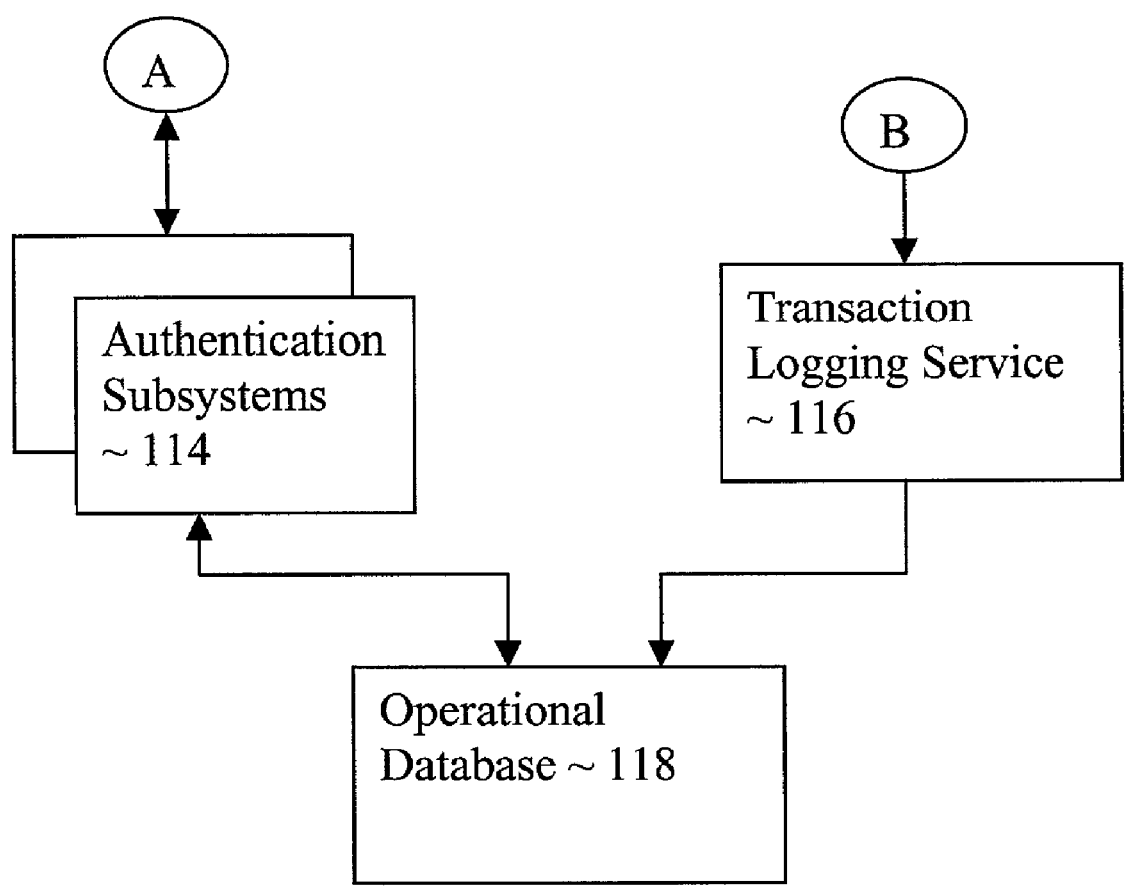

Referring now first to FIG. 1, wherein a diagram illustrating an overview of the present invention, in accordance with one embodiment, is shown. As illustrated, in accordance with the present invention, category name service (CNS) 104 is provided to provide a client 102, a category name for a data object, upon request by the client 102. As a result, any "subscribed" clients 102 accessing data objects, such as web pages of the WWW, may learn of the category or rating of an object, and perform content management or filtering accordingly. Examples of category names include Science, Literature, Sexually Explicit materials, and so forth. For the illustrated embodiment, CNS 104 is pre-provisioned (and periodically updated) with copies of the category names of a number of data objects.

Each client system 102 is equipped with an online lookup tool kit (OLTK) or function 124 to make category name and other associated requests. For the illustrated embodiment, OLTK 124 is provided as a plug-in/extension to browser 122. In alternate embodiments, OLTK 124 may be provided as an integral part of browser 124 or part of the underlying operating system.

Additionally, for the illustrated embodiment, a number of optional databases, including master category name database 110 and operational database 118, and a number of optional subsystems or services, including authentication subsystem/service 114, dynamic evaluation subsystem/service 106, review/override subsystem/service 108, transaction logging subsystem/service 116 and replication/update subsystem/service 112, are also provided to supplement CNS 104 to provide category names for data objects upon request.

Master category name database 110 is provided to hold all category names employed, as well as identifiers of categorized data objects, i.e. data objects having category names assigned. Master category name database 110 receives the category names from a number of external category name sources (not shown). These sources may be automatic or manual sources. Operational database 118 is provided to store user/requestor related information, such as identification information, subscribed services and billing information.

Authentication subsystem/service 114 is provided to authenticate a requester, confirming that the requestor is an eligible user to receive the requested category name service, thereby ensuring, for these embodiments, services are provided only to eligible users. Dynamic evaluation subsystem/service 106 is provided to dynamically determine the category name of a data object, in the event the category name of a data object has not been pre-provisioned for CNS 104, and the requestor had subscribed for the dynamic determination service. The provision advantageously enables the supplemented CNS 104 to "keep up" with the ever expanding WWW. In selected embodiments, when the data object is a web page of a web site, dynamic evaluation subsystem/service 106 further automatically walks through the entire web site, determining category names for all unknown web pages of the web site. Review/override subsystem/service 108 is provided to allow a requestor to request review of the returned category name or request the returned category name be overridden, in the event the requestor disagrees with the returned category name. The provision advantageously allows expert intervention in the ultimate category names being assigned to the various data objects.

Transaction logging subsystem/service 116 is provided to record the transactions, i.e., the requests and responses, to allow charging of users of CNS 104 for the services provided. Replication/update subsystem/service 112 is provided to pre-provision CNS 104 with the category names, thereby allowing CNS 104 to respond to many if not most of the category name requests without the need for dynamic determination. CNS 104 is pre-provisioned periodically with new category names received by master category name database 110. The frequency and periodicity of update is application dependent, and may vary from embodiment to embodiment.

For ease of understanding, master category name database 110 and operational database 118 are illustrated as two separate elements in the embodiment of FIG. 1. As will be readily apparent from the description to follow, the present invention may be practiced with the two databases combined or further subdivided. Likewise, for ease of understanding, authentication subsystem/service 114, dynamic evaluation subsystem/service 106, review/override subsystem/service 108, transaction logging subsystem/service 116 and replication/update subsystem/service 112, are illustrated as separate elements. As will also be readily apparent from the description to follow, the present invention may be practiced with some or all of these elements combined or further subdivided.

Method

Figure 2A:
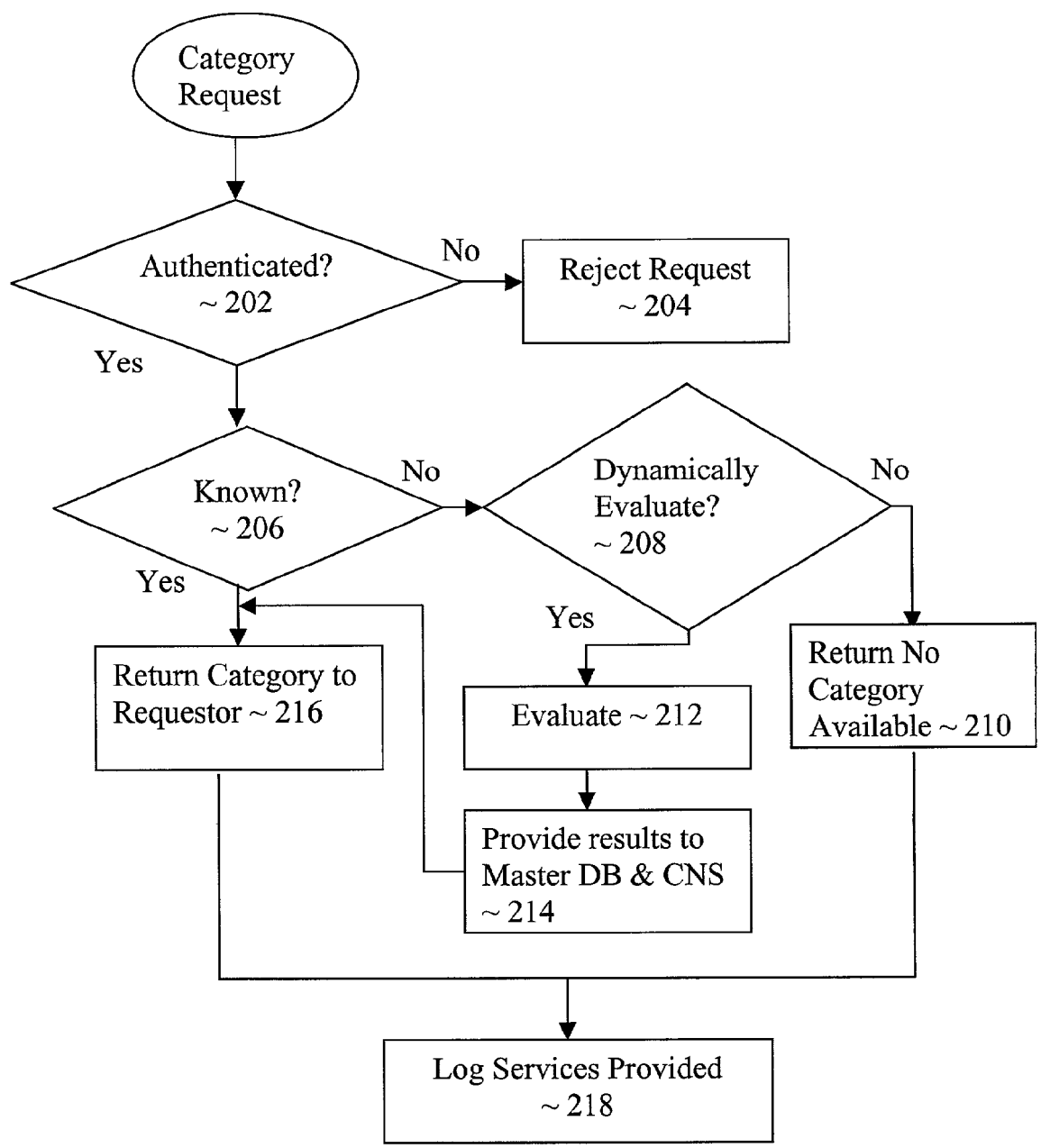
FIGS. 2a–2b illustrate a method view of the present invention, in accordance with one embodiment.
Figure 2B:
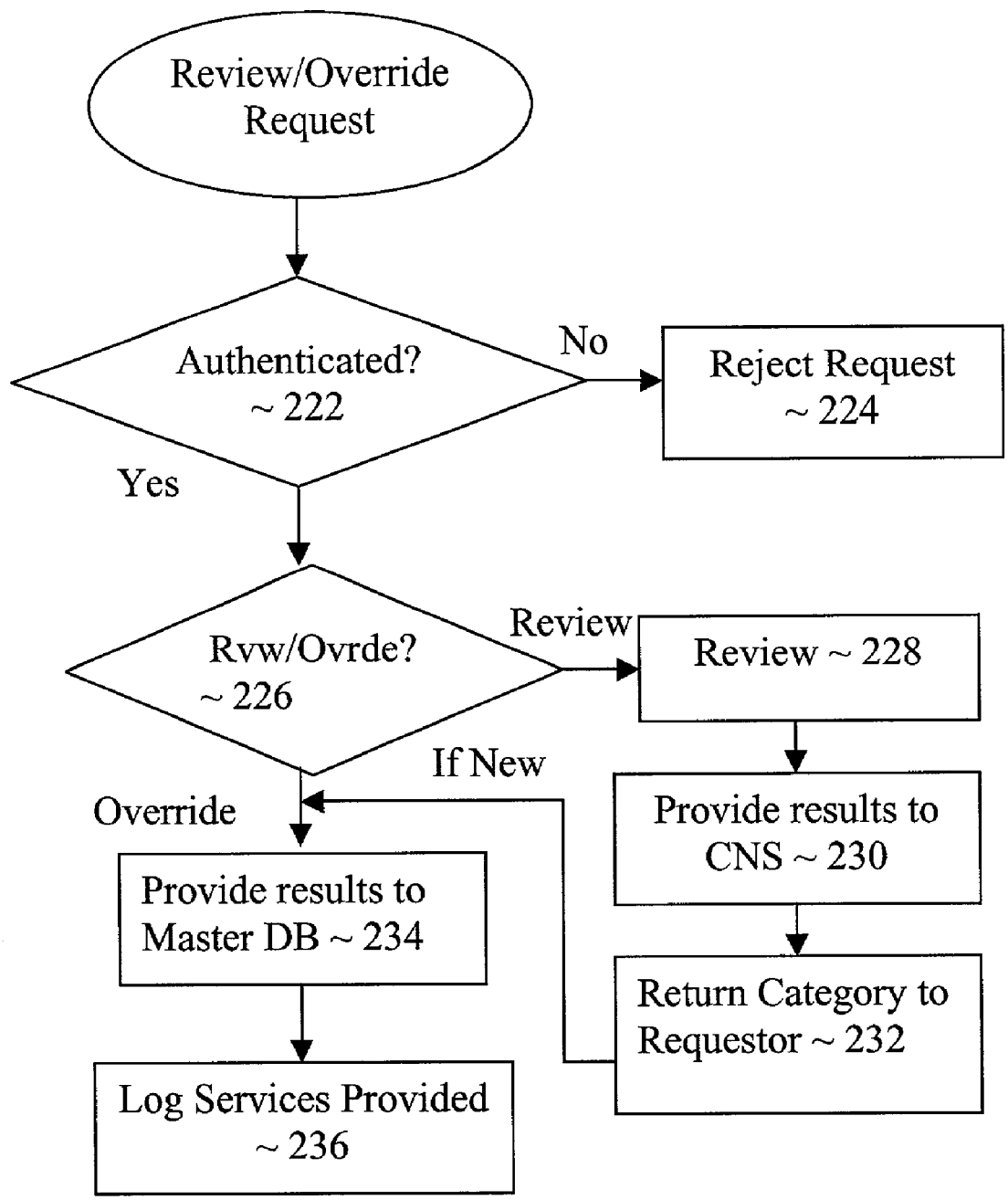

FIGS. 2a–2b illustrate a method view of the present invention, in accordance with one embodiment. As illustrated in FIG. 2a, for the embodiment, in response to a request for a category name for a data object, the requestor is first authenticated to determine if the requestor is eligible to receive the requested service, block 202. Authentication may be performed in any one of a number of authentication techniques known in the art. If the requestor fails the authentication, the request is rejected, block 204. In alternate embodiment, the present invention may be practiced without authentication, i.e. with the category name service available to all requesters.

Upon authentication or without authentication, category name service 104 determines if it knows the category name of the data object, block 206. If category name service 104 knows the category name of the data object, the category name is returned to the requestor, block 216.

On the other hand, if category name service 104 does not know the category name of the data object, for the embodiment, category name service 104 further determines if the category name is to be determined dynamically for the requestor, block 208. If it is determined that the unknown category name is not to be determined dynamically, category name service 104 returns an indication to the requester indicating the category name is not available, block 210. However, if it is determined that the unknown category name is to be dynamically determined, category name service 104b proceeds to cause the dynamic determination be performed. For the embodiment of FIG. 1, category name service 104 invokes dynamic determination subsystem/service 106 to perform the dynamic determination. Upon performing the dynamic determination, the newly determined category name is provided to category name service 104 and master category name database 110. Thereafter, the category name is returned to the requestor, block 216.

Whether a category name or category name unavailable is returned to the requester, for the embodiment, the services provided are logged to facilitate charging of the requestor for the services provided.

As illustrated in FIG. 2b, for the embodiment, in response to a request for having a returned category name reviewed or overridden, the requester is also first authenticated to determine if the requestor is eligible to receive the requested service, block 222. Again, the authentication may be performed in any one of a number of authentication techniques known in the art. If the requester fails the authentication, the request is rejected, block 224.

Upon successful authentication, category name service 104 further determines if the request is for having a returned category name reviewed or have it overridden, block 226. If the request is to have a returned category name reviewed, category name service 104 "facilitates" having the review operation performed, block 228, by invoking review/override subsystem/service 108. In one embodiment, review/override subsystem service 108 is a computer implemented categorizer, in another, it is a manual system of "experts". Upon completion of the review, the result, which may be a new category name or the same, is returned to the requestor, block 232. If the review result is a new category name being returned, the new category name is also provided to master category name database 110, block 234.

Back at block 226, if it is determined that the request of the authenticated requester is for having a returned category name overridden, the overriding category name is provided to master category name database 110, block 234.

For the illustrated embodiment, whether the request is for having the returned category name reviewed or overridden, the transaction is logged, block 236, to allow the requestor to be charged for the services rendered.

OTLK

Figure 3:
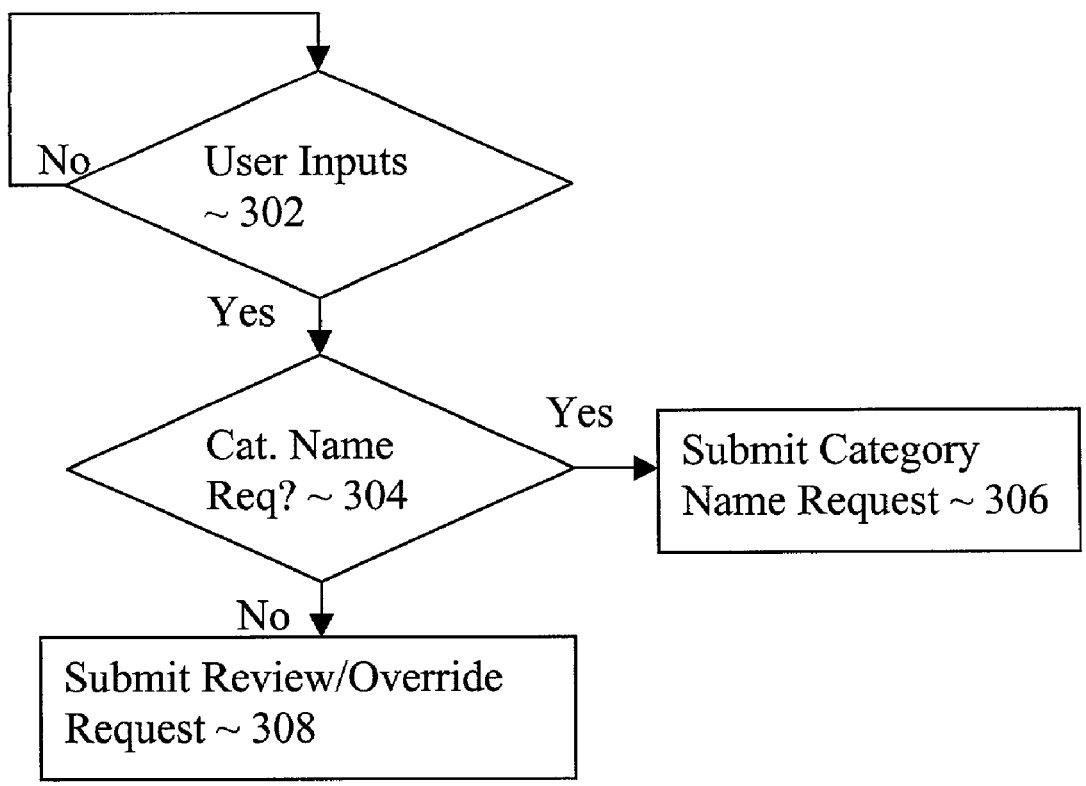
FIG. 3 illustrates the operational flow of the relevant aspects of OLTK of FIG. 1, in accordance with one embodiment.

FIG. 3 illustrates the operational flow of the relevant aspects of OTLK 124 of FIG. 1, in accordance with one embodiment. As illustrated, upon start up, OTLK 124 awaits for user inputs, block 302. User inputs may be provided via a number of input techniques known in the art. For example, the request for a category name of a data object, may be inputted or communicated by a user by highlighting an identifier of the data object (such as a link), and entering a predetermined sequence of keystrokes (such as ctrl/n) or clicking on a provided "CNS" command button (e.g. in the task bar of the browser), or selecting a "CNS" function entry in a drop down list, and so forth. Similarly, the request for review or overriding a returned category name may be likewise inputted or communicated by the user by highlighting the returned category name, and entering a predetermined sequence of keystrokes, clicking on a command button or an entry in a drop down list, as early described for requesting a category name. In the case of overriding a returned category name, input vehicles such as pop-up menus or other equivalent GUI techniques may be employed to facilitate the user in providing the overriding category name.

Upon being provided with applicable user inputs, OTLK 124 determines if the user is requesting a category name for a data object or requesting to have a returned category name reviewed/overridden, block 304. In each case, an appropriate request is packaged together and transmitted to category name service 104, block 306 or 308. The packaged request includes at least information identifying the nature of the request, i.e. category name or review/override, information identifying the data object, and information identifying the requestor. For an "overriding" request, the packaged request also includes the overriding category name. In one embodiment, the information identifying the data object includes information identifying where the data object may be obtained. The information may be packaged in any predetermined format, and transmitted to category name service 104 using any one of a number of communication protocols known in the art. In one embodiment, each request is packaged into one or more HTTP messages, in accordance with a predetermined message format, and transmitted to category name service 104 using a connection established in accordance with the HTTP message protocol, and signaled in accordance with the TCP/IP communication protocol.

Category Name Service

Figure 4:
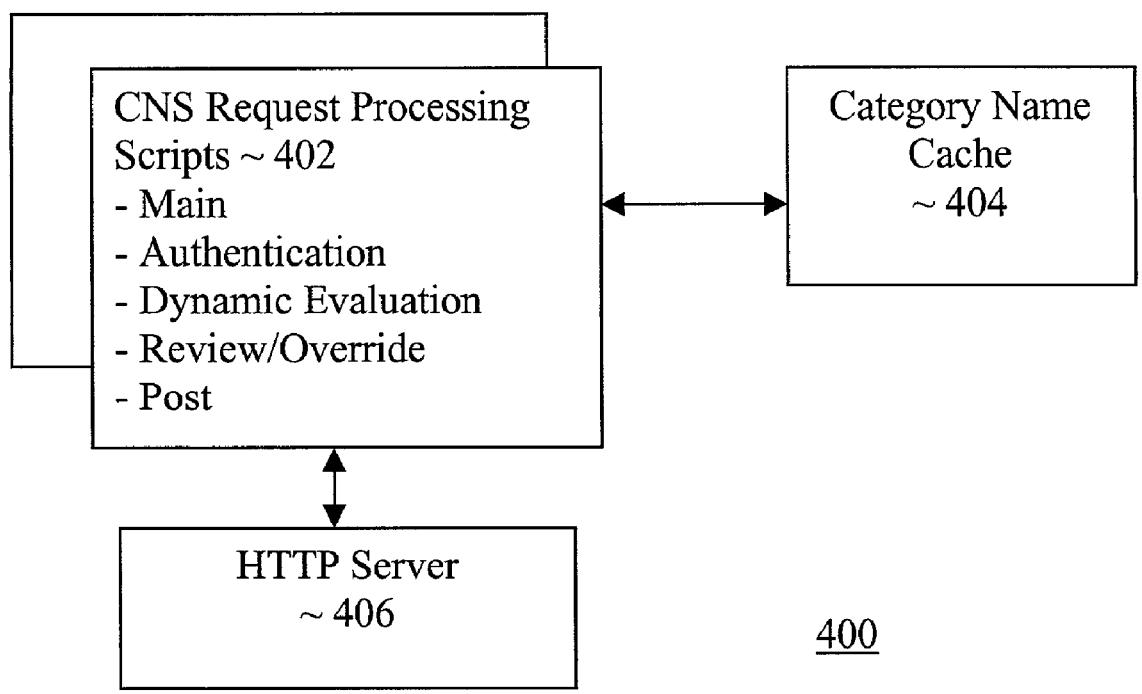
FIG. 4 illustrates a component view of the category name service of FIG. 1, in accordance with one embodiment.

FIG. 4 illustrates a component view of the category name service of the present invention, in accordance with one embodiment. As illustrated, for the embodiment of FIG. 4, category name service 400 includes a number request processing scripts/programs 402, category name cache 404, and HTTP server 406. Request scripts/programs 402, for the embodiment, includes a main script/program, an authentication module, a dynamic evaluation subsystem, a review/override subsystem, and a posting module. The main script/program is employed to coordinate the processing to be performed by the various other functions/subsystems/modules to process a request from a user. Category name cache 404 is employed to stored the category names of data objects pre-provisioned from category name service 400. HTTP server 406 is employed to facilitated communication with users' OTLKs.

HTTP server 406 is known in the art, accordingly will not be further described. One embodiment each of the main routine, the authentication module, . . . , and category name cache 404 will be described in turn below. As will be readily apparent from the description to follow, the authentication module, dynamic determination subsystem/service, and so forth, may be implemented using selected ones of a number of programming/script languages, including but are not limited to C, C++, HTML, Java, JavaScript, Perl, and so forth.

Main

Figure 5:
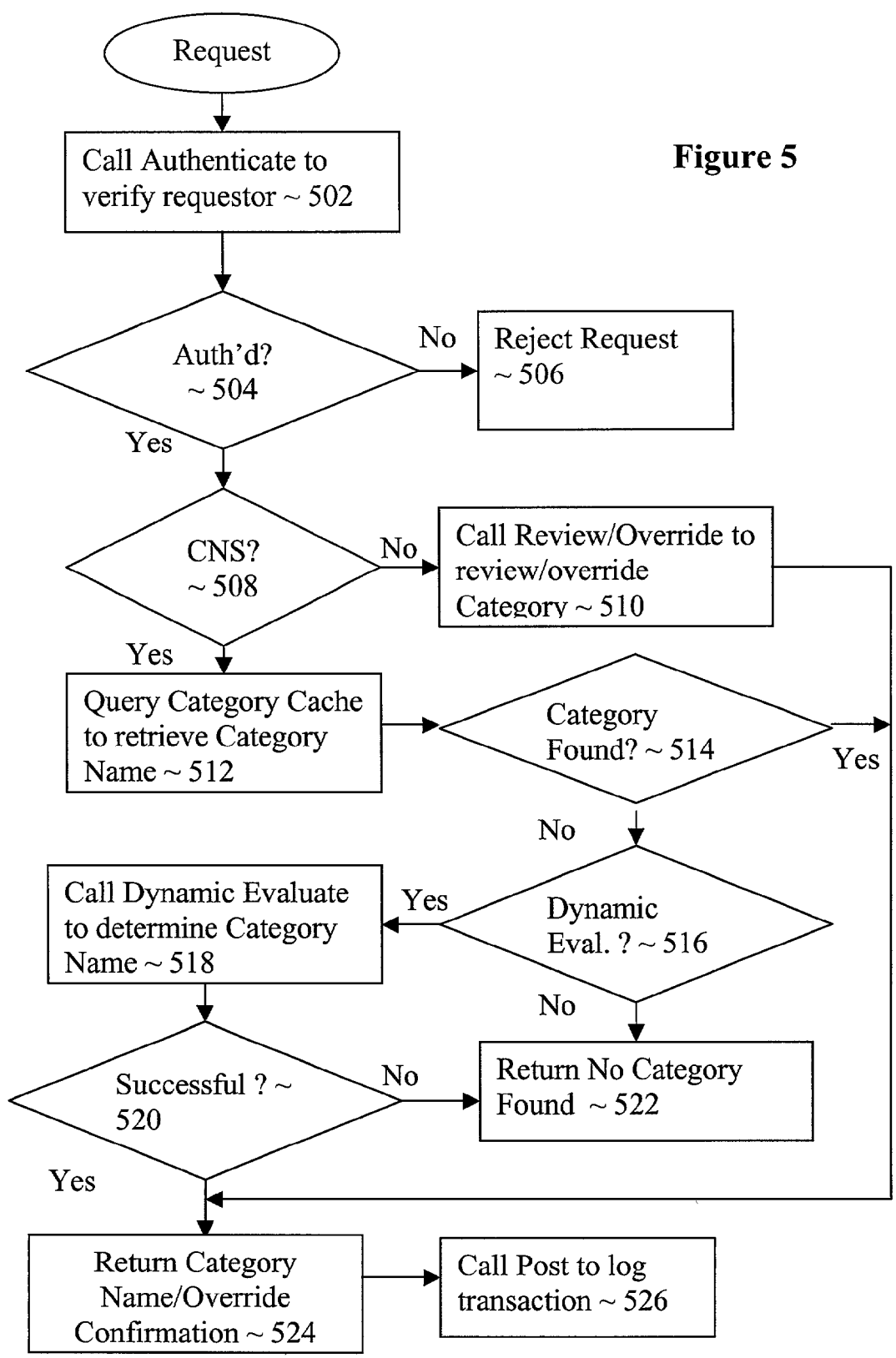
FIG. 5 illustrates the operational flow of the relevant aspects of the main module of FIG. 4, in accordance with one embodiment.

FIG. 5 illustrates the operational flow of the relevant aspects of the main routine of FIG. 4, in accordance with one embodiment. As illustrated, upon receive of a request, the authentication module is called to verify whether the requestor is entitled to receive the requested service, block 502. If the authentication fails, the request is rejected, as described earlier, block 506.

If the authentication is successful, a determination is made as to the nature of the service being requested, block 508. If the nature of the service being requested is determined to be provision of category name, the category name cache is queried to retrieve the category name for the data object, block 512. If the query results in the successful return of a known category name for the data object, the category name is returned, block 524.

If the query fails to return a known category name, it is further determined then whether dynamic determination of the category name is to be performed. In one embodiment, an indicator indicating whether the requester is to be accorded the dynamic determination service in the event the requested category name is unknown is also returned as part of the authentication process. In another embodiment, the eligibility is determined at the time the issue arises.

In any event, if the category name is unknown, and the requestor is not to be accorded the service of dynamic determination, a result message indicating no known category name is returned to the requestor, block 522. On the other hand, if dynamic determination is to be performed, the dynamic determination subsystem/service is invoked accordingly, block 518. At block 520, it is determined whether the dynamic determination subsystem/service was successful in determining a category name for the data object. If the dynamic determination subsystem/service was unsuccessful, the result message indicating no known category name is returned to the requester, block 522. Of course, if the dynamic determination subsystem/service was successful, the newly determined category name for the data object is returned to the requestor, block 524.

Back at block 508, if it was determined that the nature of the service requested is for reviewing or overriding a returned category name, the review/override subsystem/service is called, block 510. Thereafter, depending on whether it is the review case or the overriding case, a revised category name or the original category name is returned to the requestor for the former case, and an overridden confirmation message is returned for the later case. In one embodiment, the eligibility of the requestor to override a returned category name is also integrally confirmed as part of the authentication operation of block 502. Of course, in alternate embodiments, the eligibility may be determined at the time the issue arises.

Finally, for the illustrated embodiment, regardless of the nature of services provided or the results, the services provided are logged, block 526.

Authenticate

Figure 6:
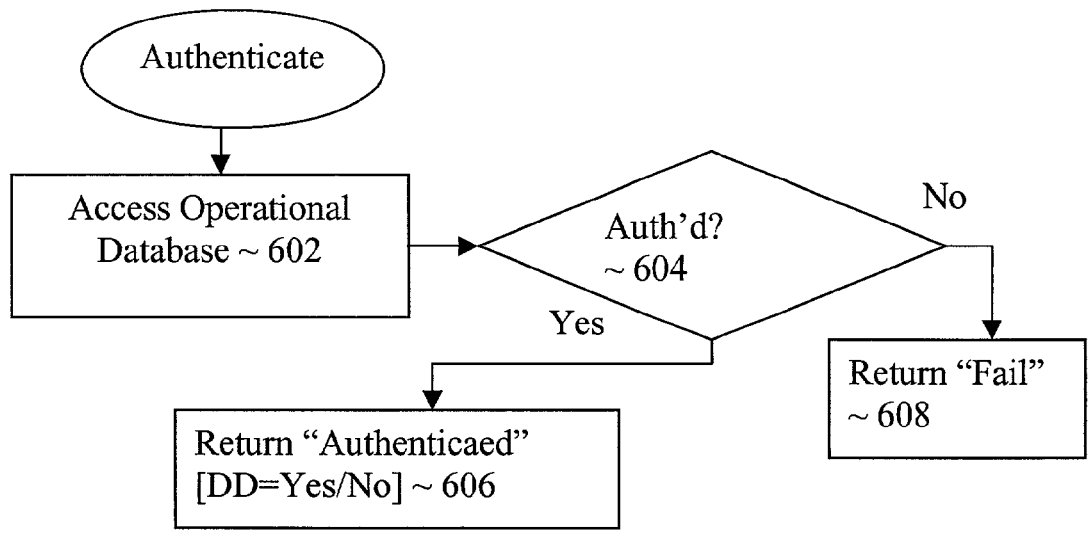
FIG. 6 illustrates the operational flow of the relevant aspects of the authenticate function of FIG. 4, in accordance with one embodiment.

FIG. 6 illustrates the operational flow of the relevant aspect of the authenticate module of FIG. 4, in accordance with one embodiment. As illustrated, upon receipt of an authentication request, operational database 118 is accessed to confirm whether the requestor is a registered service subscriber, and whether the user has subscribed for the service being requested, block 602. In one embodiment, as alluded to earlier, the authentication request includes the nature of service being requested, i.e. request for a category name, request to have a returned category name reviewed/overridden, as well as identification of the requester. In one embodiment, also as alluded to earlier, as part of the access of operational database 118, the requestor's eligibility to be accorded dynamic determination is also retrieved, if the service requested is for the provision of a category name for a data object.

At block 604, based on the information returned from operational database 118, the eligibility of the requestor to receive the requested service is determined. Depending on the result of the determination, either an "authentication failed" or "authenticated" message is returned, block 606 or 608. In one embodiment, as alluded earlier, in the case of an "authenticated" message for a request for a category name, the requestor's eligibility to be accorded dynamic determination (in the event the category name is unknown) is also returned as part of the "authenticated" message.

Dynamic Determination

Figure 7A:
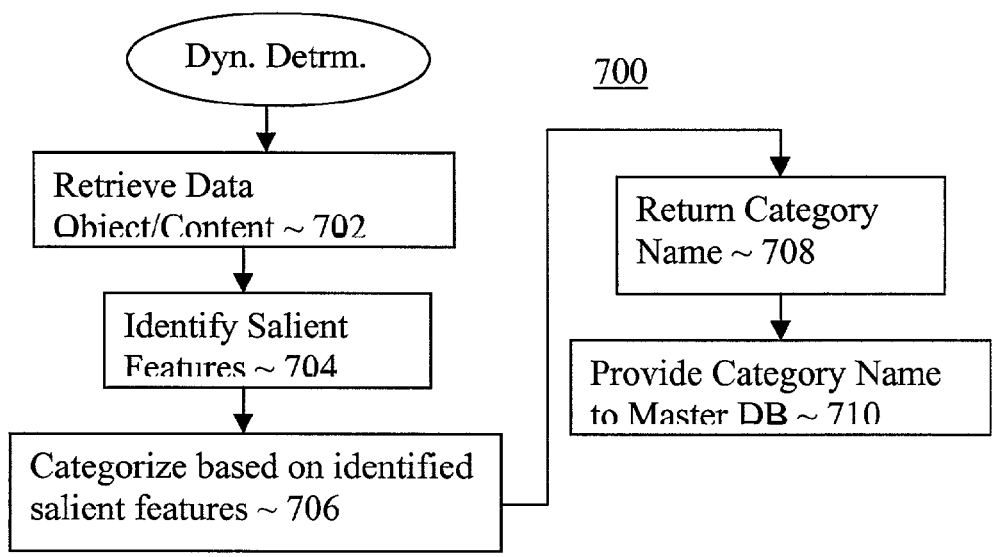
FIG. 7a illustrates the operational flow of the relevant aspects of the dynamic determination function of FIG. 4, in accordance with one embodiment.

FIG. 7a illustrates the operational flow of the relevant aspect of the dynamic determination subsystem/service of FIG. 4, in accordance with one embodiment. As illustrated, upon receipt of a request to dynamically determine a category name for a data object, the data object is retrieved, block 702. The 25 invocation includes the identification/location information of the data object. At block 704, the data object is analyzed for salient features. The analysis may be performed using any one of a number of techniques known in the art. Thereafter, the data object is categorized, i.e. assigned or attributed with a category name, based at least in part on the salient features identified, block 706. Upon assigning or attributing a category name to the data object, the category name is returned, block 708. Further, the categorization information for the data object is also provided to master category name database 710.

In selected embodiments, where the data object is a web page of a web site, the entire process 700 is automatically repeated for each unknown web page of the web site, thereby automatically determining category names for all unknown web pages of the web site. The categorization information is also provided to master category name database 710.

In selected embodiments, the automatic determination of category names for all unknown web pages of a web site is independently performed, i.e. decoupled from the category name determination of the "trigger" web page (i.e. the original request web page), thus allowing the determined category name for the "trigger" web page to be returned to the client as soon as possible. The determined category names provided to master category name database 710 are provided to CNS 104 in due course through the update process.

Review/Override

Figure 7B:
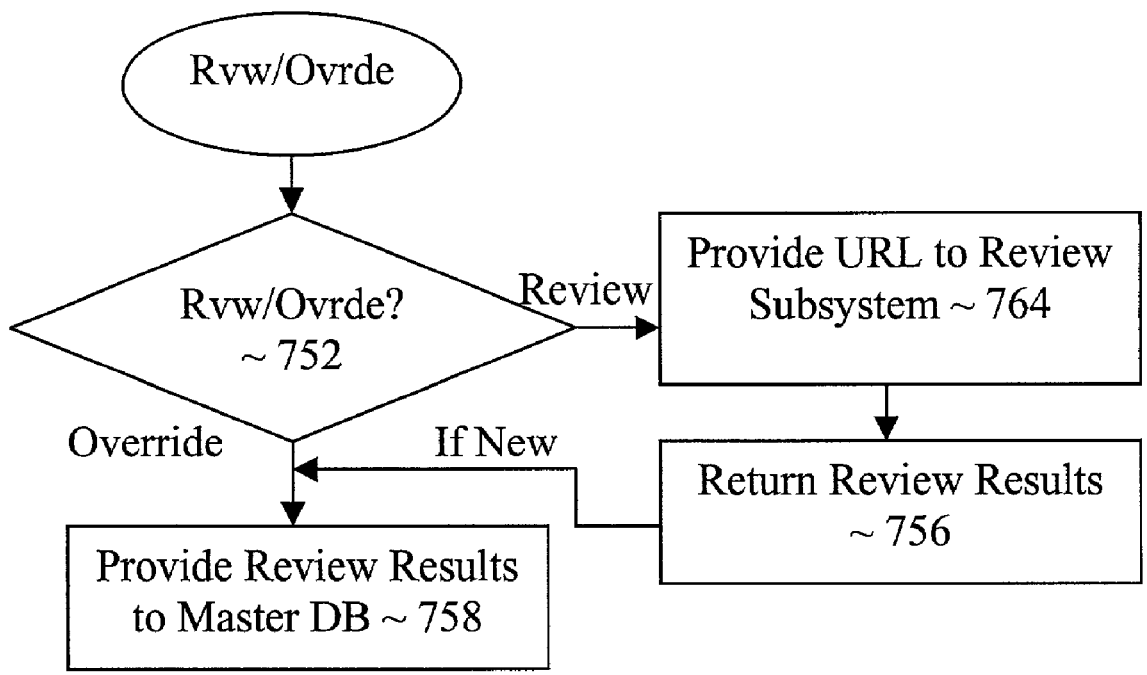
FIG. 7b illustrates the operational flow of the relevant aspects of the review/override function of FIG. 4, in accordance with one embodiment.

FIG. 7b illustrates the operational flow of the relevant aspect of the review/override subsystem/service of FIG. 4, in accordance with one embodiment. As illustrated, upon receipt of a request to review/override a returned category name, a first determination is made as to whether the request is for review or for override, block 752. If the request is for review, the identifier/locator of the data object, such as the URL of a content page, is provided to the "review subsystem" (which as described earlier, may be an automated or a manual system), block 764. Upon completion of the review, the review results, i.e. a new category name or the original category name is returned, block 756. If the result of the review is a new category name, the newly attributed category name and the identifier/locator information of the data object are provided to master category name database, block 758.

Back at block 752, if it is determined that the requested service is for overriding a returned category name, the overriding category name is provided to master category name database, block 758.

For the illustrated embodiment, it is assumed that the above described operations are invoked for authenticated requesters only.

Posting

Figure 8:
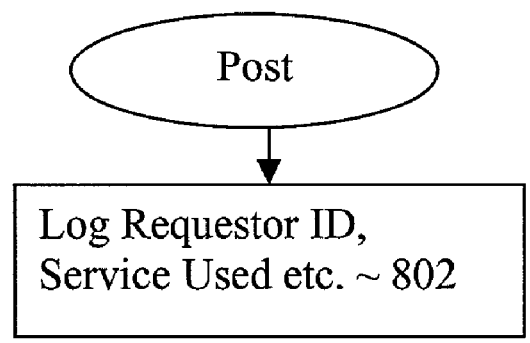
FIG. 8 illustrates the operational flow of the relevant aspects of the post function of FIG. 4, in accordance with one embodiment.

FIG. 8 illustrates the operational flow of the relevant aspect of the posting function of FIG. 4, in accordance with one embodiment. As illustrated, upon invocation, identification information of the requester, such as the requester ID, and services related information, such as the nature of services provided, the time the services are provided, etc., are logged into operational database 118. In one embodiment, as alluded to earlier, the logged information are used to invoice the requestors/users.

Sample Data Organizations

FIGS. 9a–9b illustrate two example data organizations suitable for use to store the category names and user related information for practicing the present invention, in accordance with one embodiment. As illustrated in FIG. 9a, category name table/view 900 includes column 902 and column 904 for storing the data object identifiers and the assigned category names. Table 900 may also include other columns, such as column 909, for storing other data.

Similarly, as illustrated in FIG. 9b, user table/view 920 includes column 922 and columns 924 for storing user identifiers, and the users' basic information, such as their names, addresses, phone numbers, fax numbers, email addresses, and so forth. User table/view 920 further includes columns 926 and 928 for storing user service subscription information and usage billing information. Table/view 920 may also include other columns, such as column 929 for storing other user related data.

In one embodiment, tables/views 900 and 920 are relational tables/views of one or more relational databases. In alternate embodiments, other equivalent data structures may be used instead.

Example Computer System

Figure 10:
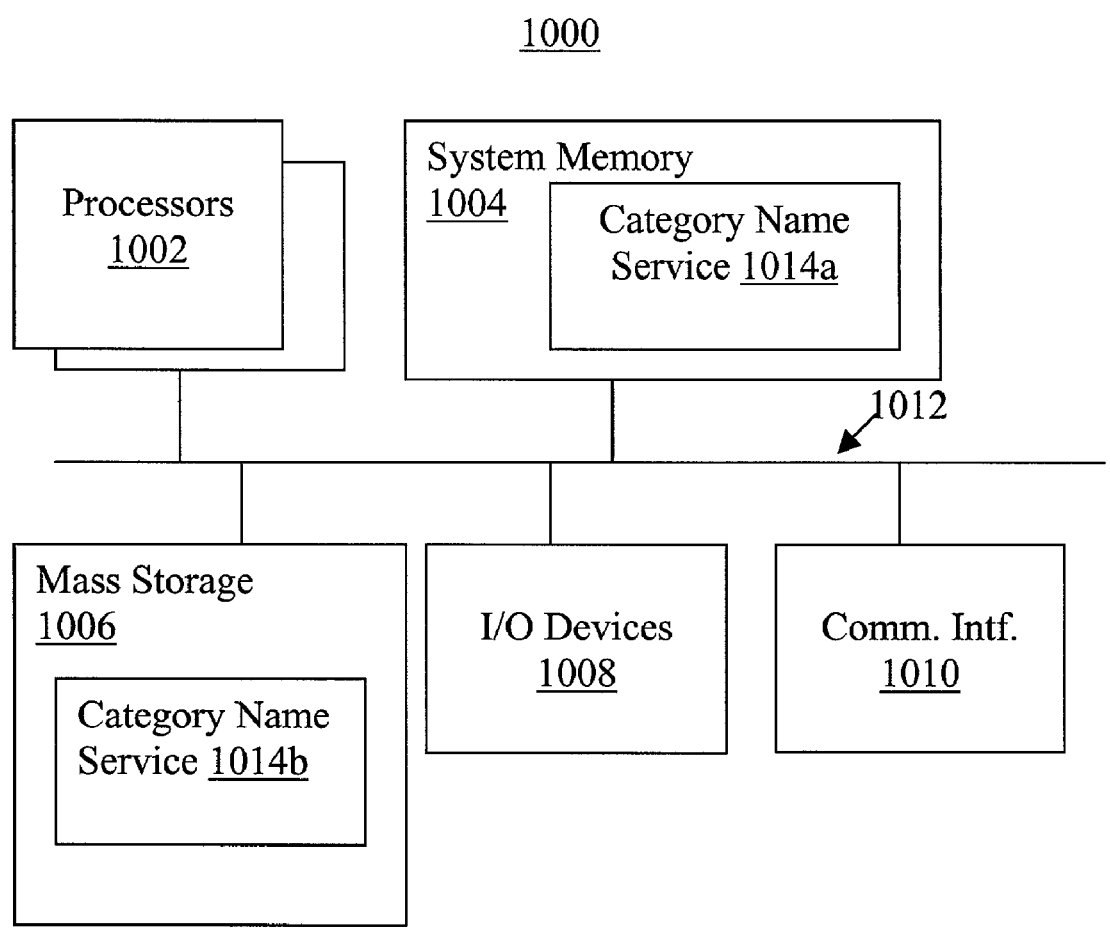
FIG. 10 illustrates an example computer system suitable for use to practice the present invention, in accordance with one embodiment.

FIG. 10 illustrates an example computer system suitable for use as a server to host the category name service (and optionally, the supplemental services) of the present invention, in accordance with one embodiment. As shown, computer system 1000 includes one or more processors 1002 and system memory 1004. Additionally, computer system 1000 includes mass storage devices 1006 (such as diskette, hard drive, CDROM and so forth), input/output devices 1008 (such as keyboard, cursor control and so forth) and communication interfaces 1010 (such as network interface cards, modems and so forth). The elements are coupled to each other via system bus 1012, which represents one or more buses. In the case of multiple buses, they are bridged by one or more bus bridges (not shown). Each of these elements performs its conventional functions known in the art. In particular, system memory 1004 and mass storage 1006 are employed to store a working copy and a permanent copy of the programming instructions implementing the category name services (with or without the optional supplemental services) of the present invention. The permanent copy of the programming instructions may be loaded into mass storage 1006 in the factory, or in the field, as described earlier, through a distribution medium (not shown) or through communication interface 1010 (from a distribution server (not shown). The constitution of these elements 1002–1012 are known, and accordingly will not be further described.

CONCLUSION AND EPILOGUE

Thus, it can be seen from the above descriptions, a novel method and apparatus for providing category name service for identifying an attributed category to a data object upon request has been described. The novel method/apparatus is advantageously scalable to support an ever increasing amount of data objects requiring category name services.

While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A computer-implemented method comprising:
   receiving a request to provide a category name for a data object;
   determining if the category name for the data object is known;
   determining if the category name is to be dynamically determined if the category name is not known;
   requesting the unknown category name to be dynamically determined if it is determined that the unknown category name is to be dynamically determined;
   returning the category name to a requestor of the request if the category name is known or if unknown, dynamically determined;
   receiving a second request to override the category name returned for the data object;
   determining if a requestor of the requested override is authorized to request the override, said determining comprising retrieving privilege information about the requestor; and
   overriding the category name of the data object if the requestor of the requested override is authorized to request the override.

2. The method of claim 1, wherein said receiving a request to provide a category name for a data object comprises receiving a uniform resource locator for the data object.

3. The method of claim 1, wherein said determining if the category name for the data object is known comprises attempting to retrieve the category name from a datastore.

4. The method of claim 3, wherein said attempting to retrieve comprises attempting to retrieve the category name from a local datastore.

5. The method of claim 1, wherein said determining if the category name is to be dynamically determined if the category name is not known comprises determining if the requestor of the request has subscribed to a dynamic evaluation service.

6. The method of claim 5, wherein said determining if the requestor of the request has subscribed to a dynamic evaluation service comprises retrieving subscribed service information about the requestor.

7. The method of claim 1, wherein said requesting the unknown category name to be dynamically determined if it is determined that the unknown category name is to be dynamically determined comprises requesting a dynamic evaluation service to determine the category name of the data object.

8. The method of claim 7, wherein said data object is a web page of a web site, and said dynamic evaluation service further automatically determines category names for all unknown web pages of the web site.

9. The method of claim 1, wherein said method further comprises receiving a second request to review the category name returned for the data object, and requesting review of the returned category name.

10. The method of claim 9, wherein said requesting review of the returned category name comprises re-assessing the association of the data object with the returned category name.

11. A computer-implemented method comprising:
receiving a first request to provide a category name for a data object;
returning the category name to a requestor of the first request;
receiving a second request to override the category name returned for the data object;
determining if a requestor of the requested override is authorized to request the override, said determining comprising retrieving privilege information about the requestor; and
requesting to have the category name of the data object overridden if the requestor of the requested override is authorized to request the override.

12. The method of claim 11, wherein said requesting to have the category name of the data object overridden comprises overriding the category name of the data object.

13. An apparatus comprising:
a storage medium having stored therein a plurality of programming instructions designed to implement a plurality of functions of a category name service for providing a category name to a data object, including first one or more functions
to receive a request to provide a category name for a data object,
to determine if the category name for the data object is known,
to determine if the category name is to be dynamically determined if the category name is not known,
to request the unknown category name to be dynamically determined if it is determined that the unknown category name is to be dynamically determined,
to return the category name to a requestor of the request if the category name is known or if unknown, dynamically determined,
to receive a second request to override the category name returned for the data object
to determine if a requestor of the requested override is authorized to request the override by retrieving privilege information about the requestor,
to override the category name of the data object if the requestor of the requested override is authorized to request the override; and
one or more processors coupled to the storage medium to execute the programming instructions.

14. The apparatus of claim 13, wherein the first one or more functions are designed to receive a uniform resource locator for the data object.

15. The apparatus of claim 13, wherein the first one or more functions are designed to determine if the category name for the data object is known by attempting to retrieve the category name from a datastore.

16. The apparatus of claim 15, wherein the first one or more functions are designed to perform said attempting to retrieve by attempting to retrieve the category name from a local datastore, and the storage medium further having stored therein said local datastore.

17. The apparatus of claim 13, wherein the first one or more functions are designed to determine if the category name is to be dynamically determined if the category name is not known by determining if the requestor of the request has subscribed to a dynamic evaluation service.

18. The apparatus of claim 17, wherein said first one or more functions are designed to determine if the requestor of the request has subscribed to a dynamic evaluation service by retrieving subscribed service information about the requestor.

19. The apparatus of claim 13, wherein the plurality of functions further includes second one or more functions to dynamically determine a category name for a data object, and the first one or more functions are designed to request the second one or more functions to determine the category name of the data object.

20. The apparatus of claim 19, wherein said data object is a web page of a web site, and said second one or more functions further automatically determines category names for all unknown web pages of the web site.

21. The apparatus of claim 13, wherein the first one or more functions are also designed to receive a second request to review the category name returned for the data object and to request review of the returned category name.

22. The apparatus of claim 21, wherein the plurality of functions further includes second one or more functions to re-assess the association of a data object with a category name, and said first one or more functions are designed to request the second one or more functions to re-assess the association of the data object with the returned category name.

23. An apparatus comprising:
a storage medium having stored therein a plurality of programming instructions designed to implement a plurality of functions of a category name service for providing a category name to a data object, including first one or more functions
to receive a first request to provide a category name for a data object,
to return the category name to a requestor of the first request, to receive a second request to override the category name returned for the data object, to determine if a requestor of the requested override is authorized to request the override by retrieving privilege information about the requestor, and to request to have the category name of the data object overridden if the requestor of the requested override is authorized to request the override; and one or more processors coupled to the storage medium to execute the programming instructions.

24. The apparatus of claim 23, wherein said requesting to have the category name of the data object overridden comprises overriding the category name of the data object.

* * * * *